(12) United States Patent
Moss et al.

(10) Patent No.: US 7,363,564 B2
(45) Date of Patent: Apr. 22, 2008

(54) METHOD AND APPARATUS FOR SECURING COMMUNICATIONS PORTS IN AN ELECTRONIC DEVICE

(75) Inventors: Robert Wayne Moss, Longmont, CO (US); Monty Aaron Forehand, Loveland, CO (US); Donald Preston Matthews, Jr., Longmont, CO (US); Laszlo Hars, Cranberry Township, PA (US); Donald Rozinak Beaver, Pittsburgh, PA (US); Charles William Thiesfeld, Lakeville, MN (US); Jon David Trantham, Chanhassen, MN (US); William Preston Goodwill, Edmond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 182 days.

(21) Appl. No.: 11/182,291

(22) Filed: Jul. 15, 2005

(65) Prior Publication Data
US 2007/0033454 A1    Feb. 8, 2007

(51) Int. Cl.
*G01R 31/28* (2006.01)
*H03K 19/00* (2006.01)

(52) U.S. Cl. ............ 714/734; 714/727; 714/724; 714/726; 714/723; 326/8; 326/16; 713/182; 726/26

(58) Field of Classification Search .............. None
See application file for complete search history.

(56) References Cited

U.S. PATENT DOCUMENTS

| | | | |
|---|---|---|---|
| 5,467,396 A | 11/1995 | Schossow et al. | |
| 5,469,557 A | 11/1995 | Salt et al. | |
| 5,515,540 A | 5/1996 | Grider et al. | |
| 5,742,800 A | 4/1998 | Forehand | |
| 6,012,146 A | * 1/2000 | Liebenow | 726/17 |
| 6,026,293 A | 2/2000 | Osborn | |
| 6,268,789 B1 | 7/2001 | Diamant et al. | |
| 6,272,533 B1 | * 8/2001 | Browne | 709/213 |
| 6,272,637 B1 | 8/2001 | Little et al. | |
| 6,466,048 B1 | * 10/2002 | Goodman | 326/8 |
| 6,499,124 B1 | * 12/2002 | Jacobson | 714/727 |
| 6,910,137 B2 | * 6/2005 | Liebenow et al. | 726/34 |
| 7,009,419 B2 | * 3/2006 | Goodman | 326/8 |
| 7,185,249 B2 | * 2/2007 | Tkacik et al. | 714/726 |
| 7,216,275 B2 | * 5/2007 | Liang | 714/727 |

(Continued)

FOREIGN PATENT DOCUMENTS

EP    1209563 A2    5/2002

(Continued)

OTHER PUBLICATIONS

U.S. Appl. No. 11/070,911, filed Mar. 3, 2005, Hars et al.

*Primary Examiner*—John P Trimmings
(74) *Attorney, Agent, or Firm*—Robert P. Lenart, Esq.; Pietragallo Gordon Alfano Bosick & Raspanti, LLP (57) ABSTRACT

An apparatus comprises at least one port for coupling signals to the apparatus, a mode selector for setting the apparatus to a normal mode or a debug mode, and a port control for controlling access to secure information in the apparatus through the port in accordance with the selected mode. A method for controlling access to the port is also provided.

21 Claims, 4 Drawing Sheets

U.S. PATENT DOCUMENTS

| | | |
|---|---|---|
| 2002/0013670 A1 | 1/2002 | Ouellette et al. |
| 2002/0174342 A1 | 11/2002 | Freeman et al. |
| 2003/0014642 A1 | 1/2003 | Martinsson et al. |
| 2003/0212897 A1* | 11/2003 | Dickerson et al. ........... 713/200 |
| 2004/0025027 A1 | 2/2004 | Balard et al. |
| 2004/0059928 A1* | 3/2004 | Fujiwara et al. ............ 713/189 |
| 2004/0128523 A1* | 7/2004 | Fujioka ...................... 713/189 |
| 2004/0210797 A1* | 10/2004 | Kimelman et al. ........... 714/25 |
| 2004/0236874 A1* | 11/2004 | Largman et al. ............... 710/8 |
| 2005/0066189 A1* | 3/2005 | Moss et al. .................. 713/200 |
| 2005/0268174 A1* | 12/2005 | Kumagai ..................... 714/38 |
| 2006/0005023 A1* | 1/2006 | Homer et al. ............... 713/168 |
| 2006/0075312 A1* | 4/2006 | Fischer et al. ................. 714/48 |
| 2006/0136751 A1* | 6/2006 | Bonaccio et al. ........... 713/194 |
| 2006/0200682 A1* | 9/2006 | Hars et al. .................. 713/193 |

FOREIGN PATENT DOCUMENTS

| | | |
|---|---|---|
| EP | 1209563 A3 | 12/2004 |

* cited by examiner

METHOD AND APPARATUS FOR SECURING COMMUNICATIONS PORTS IN AN ELECTRONIC DEVICE

FIELD OF THE INVENTION

This invention relates to control of, and access to, electronic devices. More particularly the invention relates to control of, and access to, electronic devices that contain secure information.

BACKGROUND OF THE INVENTION

Secure systems contain information that must be protected from unauthorized external observation and control. Unauthorized external access, either via hardware state change or modification of information stored in the hardware, or access of information stored in the hardware, must be prevented.

Historically, disc drives have multiple communications ports in addition to the drive's host interface port. Such ports include drive serial ports, embedded trace module ports, and Joint Test Action Group (JTAG) ports. These ports are used in the manufacture, development, and debugging of the disc drives. To facilitate their intended purpose, in the past, such ports have been specifically designed to be easily accessible.

Drive serial ports provide the primary connection for manufacturing tests. The drive serial port is used for an initial download of firmware in manufacturing and lab environments, and for initial code downloads to uninitialized printed circuit board assemblies. These ports serve as the primary drive interface to test systems, and are used for initial interrogations, prior to activation of the host interface.

The embedded trace module (ETM) is a module that is tightly coupled to the microprocessor. It is configured by the JTAG port, and stores program flow and data trace information. This information is streamed out of the chip via a set of pins on an application specific integrated circuit (ASIC) called the ETM port. This port is an output only port.

The JTAG port is a standard port used throughout the ASIC industry. There are many off-the-shelf tools designed for connection and communication with JTAG ports. The uses of the JTAG port include: boundary scan and other tests by ASIC manufacturers; configuration and command emulation; basic emulation/interrogation mechanisms; and as a hot-plug for in-situ interrogation of electronic devices.

Scan test procedures are set up to allow for both controllability and observability of the internal state and storage elements contained within hardware systems. Scan test hardware can be used to facilitate extraction of protected information, or to change the state of system hardware in order to change the operability of a subsystem.

A fuse or other permanently alterable component can be used to disable the scan chain after production testing. However, the use of a fuse or other permanently alterable component requires additional cost. In addition, once the scan chain is disabled, it can no longer be used for additional testing. The alterable component must have a permanent state change or an attack on that component may allow access to the scan chain.

Access can also be limited by several other techniques. For example, the outputs of targeted storage elements can be gated when in the scan test mode to prevent observability during the capture phase of a scan test. The inputs of targeted storage elements can be forced to a known value when in the scan test mode to prevent controllability during the capture phase of scan test. Targeted storage elements can be removed from the scan chain to prevent controllability and observability during the scan phase of the scan test.

Combinations of gating outputs, forcing inputs, and removing targeted storage elements from the scan chain requires that such elements be identified and that the intended restrictions are not circumvented due to design flows or design tool issues. Thorough verification that a storage element is non-controllable, non-observable, and non-scannable is difficult. In addition, the storage elements will no longer be testable using scan testing. These techniques allow for scan testing in the non-secure portions of a design, rather than excluding an entire design subsystem from scan test.

Non-scan test methodologies such as built-in self-test can be used. Non-scan methodologies are viable alternatives, but are difficult to automate and usually require additional cost due to the test circuitry. Depending on the type of circuitry that is being tested, built-in self-test may, or may not, provide adequate test coverage. Built-in self-test coverage must also be verified on a design-by-design basis, with the exception of certain classes of devices, such as memory built-in test systems.

The goal of the port hardening is to secure the ports, but still allow access by authorized personnel for initialization, debug, test, and interrogation of the drive. To achieve this goal, it is desirable to: secure external hardware entry points to the drive; allow access to selected test functions via the JTAG interface; allow access to progressive levels of hardware by authorized personnel for development, debug, and interrogation; protect the secrecy of the user's clear-text, prevent unintended access to secret information stored in the hardware (such as keys) and prevent control of the hardware that would allow a user to circumvent security features, even in debug situations; and overall, provide the same level of access for drive development and debug as in previous drives.

With disc drives containing secure information, the ports must be secured to allow only authorized access, for manufacture and debug purposes. More specifically, the ports must be blocked from malicious entities that could gain value by discovering secrets through these ports.

SUMMARY OF THE INVENTION

This invention provides an apparatus comprises at least one port for coupling signals to the apparatus, a mode selector for setting the apparatus to a normal mode or a debug mode, and a port control for controlling access to secure information in the apparatus through the port in accordance with the selected mode.

This invention also provides a method of controlling access to at least one port of an apparatus, the method comprising: setting the apparatus to a normal mode or a debug mode using a mode selector; and controlling access to secure information in the apparatus through the port in accordance with the selected mode.

In another aspect, the invention provides a boundary test method comprising: detecting a reset signal; clearing contents of storage elements of an apparatus in response to the reset signal; placing the apparatus in a scan test mode and conducting a scan test on the components of the apparatus; and clearing contents of the storage elements of an apparatus prior to exiting the scan test mode.

This invention further encompasses an apparatus comprising a scan signal intercept module for receiving a system scan mode enable signal, and for detecting a system reset signal for clearing contents of storage elements of the apparatus, placing the apparatus in a scan test mode, and clearing contents of the storage elements of an apparatus prior to exiting the scan test mode.

DETAILED DESCRIPTION OF THE INVENTION

This invention provides methods and apparatus for limiting access to ports of electronic devices, to only authorized entities. The ports can be secured, while still allowing authorized access for manufacture, test, and debug. Different levels of accessibility can be provided depending upon the nature of the port and its use, and the level of security risk posed by unauthorized access to that port.

When applied to a disc drive, the invention provides for debug modes, which allow authorized access, but also put the drive in a lower state of trust. This allows debug interrogation, while still protecting an end-user's secret information. While in these modes, the drive can report to entities wishing to establish trust, that the drive is in a reduced trust state. The debug mode(s) could be used to secure additional parts of the system including other ports, and other pieces of circuitry.

The following description defines the hardware, firmware, and test equipment features required to secure these ports and provides mechanisms for access by those with the appropriate credentials. Firmware may be fixed/static, such as firmware located within an on-chip ROM, or updated/dynamic, such as firmware located within a flash ROM, PROM, or loaded at runtime from a hard disc. As used in this description, fixed firmware will be termed ROM code, and dynamic firmware will be termed drive firmware. The invention can be applied to various interface ports including drive serial ports, servo test ports, JTAG ports, and embedded trace modules.

Figure 1:
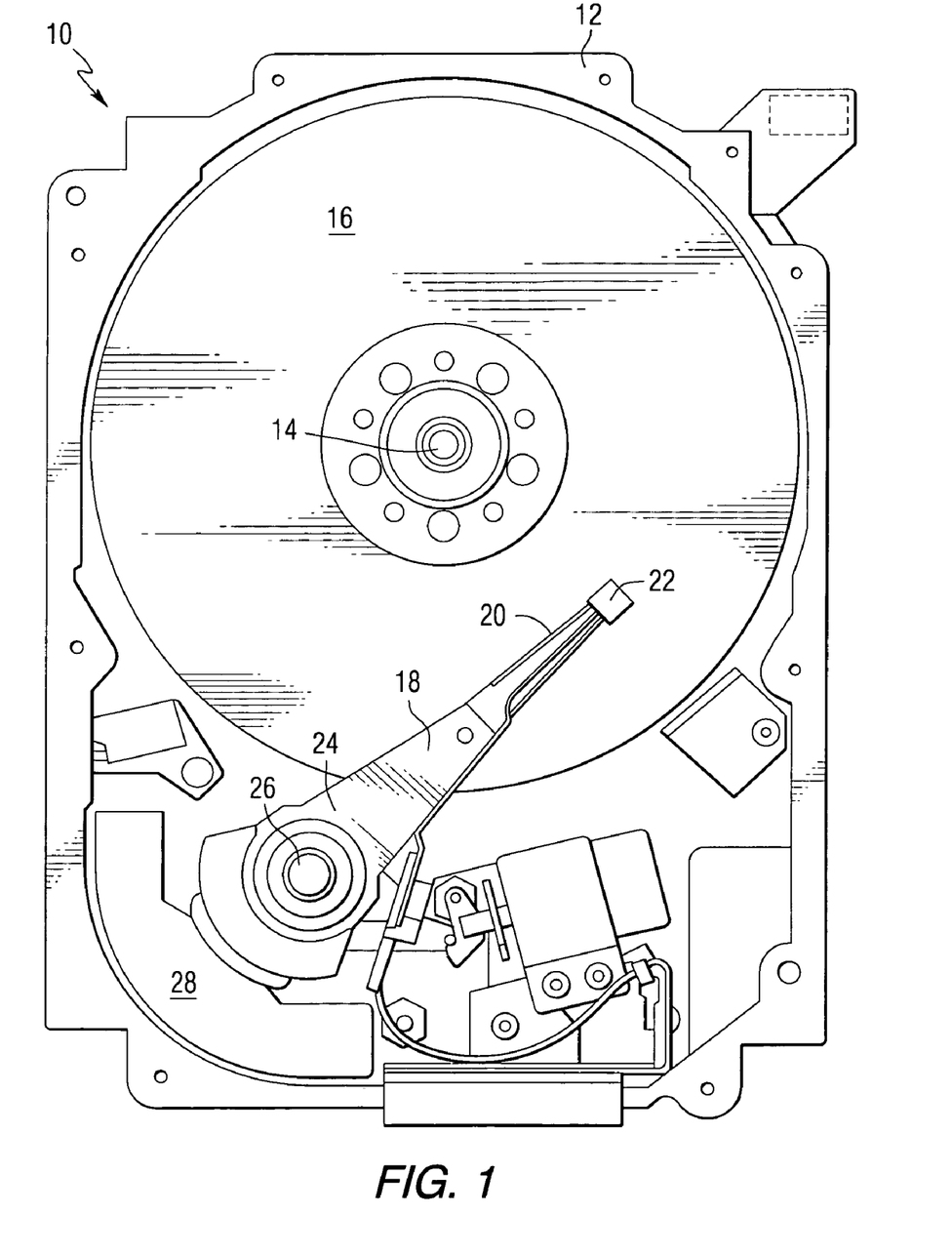
FIG. 1 is a pictorial representation of the mechanical portion of a disc drive that can be constructed in accordance with the invention.

Referring to the drawings, FIG. 1 is a pictorial representation of the mechanical portion of a disc drive 10 that can be constructed in accordance with the invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor, which may be a voice coil motor 28, is located at the arm's second end 24, for pivoting the arm 18 to position the head 22 over a desired sector of the disc 16.

Figure 2:
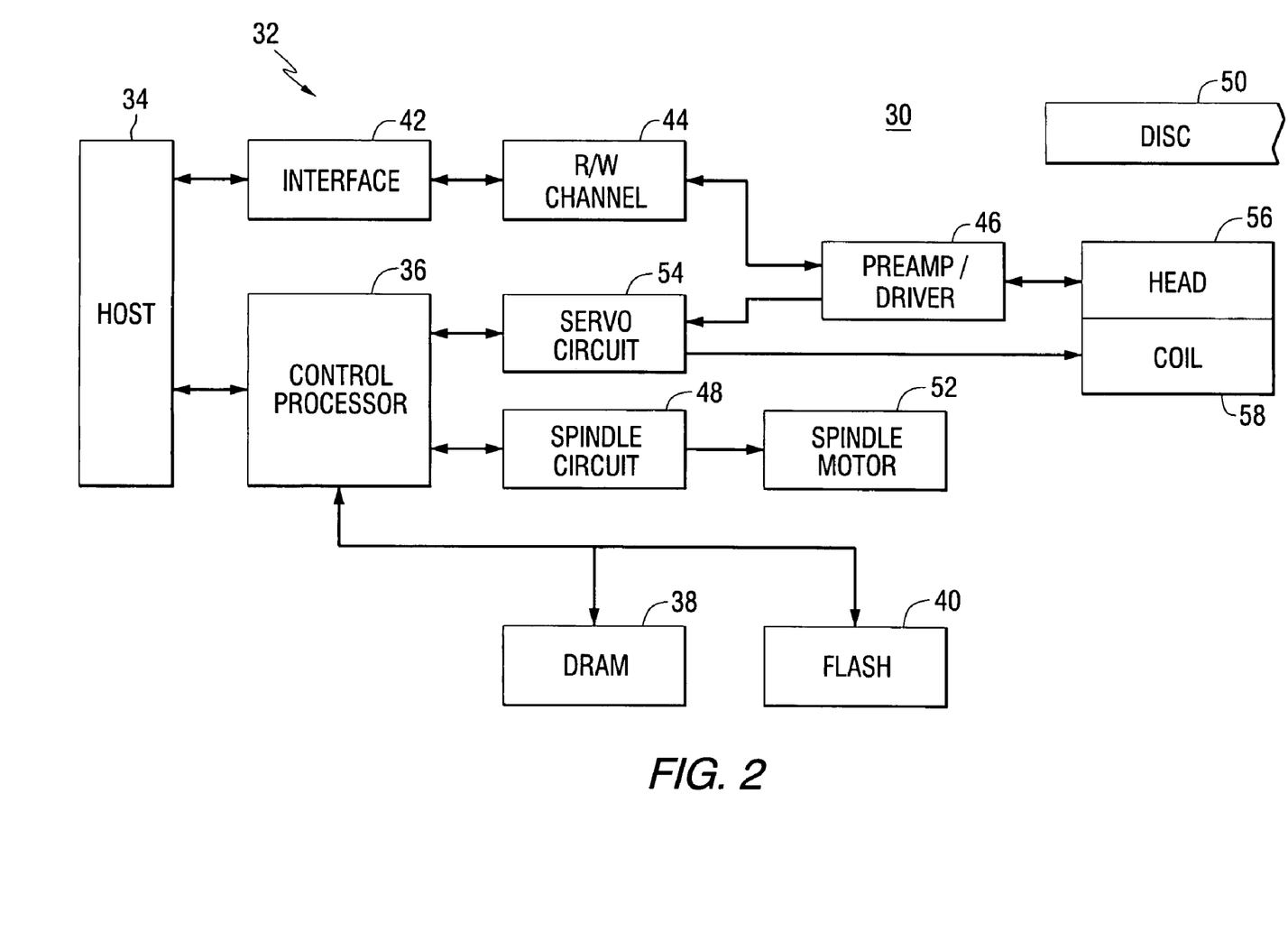
FIG. 2 is a block diagram of a system including a disc drive that can be constructed in accordance with the invention.

A functional block diagram of a system that includes a disc drive 30, having control circuitry 32, is provided in FIG. 2. A host computer 34 provides top level control of a disc drive control processor 36, which in turn controls the operation of the disc drive 30 in accordance with programming and information stored in dynamic random access memory (DRAM) 38 and non-volatile flash memory 40.

Data to be stored by the disc drive are transferred from the host computer 34 to an interface circuit 42, which includes a data buffer for temporarily buffering the data and a sequencer for directing the operation of a read/write channel 44 and a preamp/driver circuit 46 during data transfer operations. A spindle circuit 48 is provided to control the rotation of the discs 50 by the spindle motor 52.

A servo circuit 54 is provided to control the position of one or more recording heads 56 relative to the discs 50 as part of a servo loop established by the head 56, the preamp/driver 46, the servo circuit 54 and the coil 58 that controls the position of an actuator arm. The servo circuit 54 includes a digital signal processor (DSP) which is programmed to carry out two main types of servo operation: seeking and track following.

Figure 3:
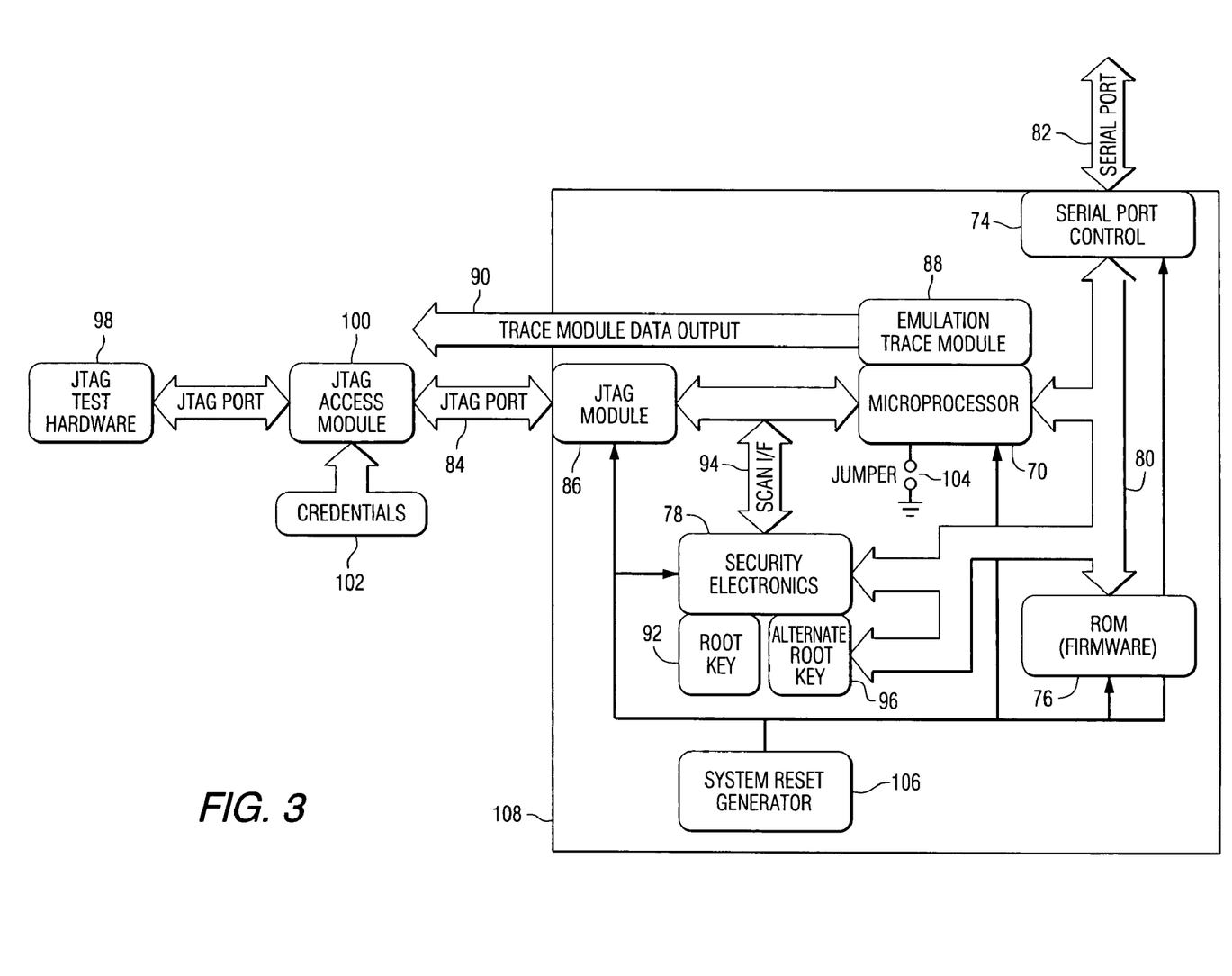
FIG. 3 is a block diagram of portions of the controller of the disc drive of FIG. 2.

FIG. 3 is a block diagram of portions of the control circuit of FIG. 2. The circuit includes a microprocessor 70 that controls the various functions of the disc drive. The microprocessor is connected to a serial port control 74, a memory 76, and a security electronic module 78, through a first bus 80. In this example, the memory comprises a read only memory that is used to store firmware. A serial port 82 is connected to the serial port control. A JTAG port 84 is coupled to the microprocessor through a JTAG module 86. An emulation trace module 88 is coupled to the microprocessor, and used to produce a trace module data output 90. The security electronics module 78 stores a root key 92 for the disc drive. The root key is used to control access to secure information stored in the drive.

The security electronics module is connected to the JTAG module and the microprocessor through a scan interface 94. An alternate root key 96 is provided for use in debug operations. The alternate root key does not allow access to secure information in the disc drive. JTAG test hardware 98 can be coupled to the JTAG port through a JTAG access module 100. The JTAG access module will allow access after receiving appropriate credentials 102. A jumper 104 serves as a mode selector for setting the disc drive to a normal mode or a debug mode. A system reset generator 106 provides reset signals to multiple components of the control circuit. The serial port control, JTAG module, and emulation trace module are used to perform various access control functions. Portions 108 of the circuitry illustrated in FIG. 3 can be implemented using one or more application specific integrated circuits (ASICs).

For the purposes of this description, two operating modes are considered, a debug mode and a normal operating mode. Functionality in each of these modes will be defined below. A mode selector, or mode selection means, which can be for example a jumper or other pull-up/down hardware feature, is provided on the drive to signal the electronics in the controller ASIC to enter the debug mode or the normal mode. Upon detection of the debug state at power-up, the controller electronics will enter the debug mode. The drive will remain in this mode, until a hardware reset (electrical toggling of the system reset signal on the drive) is performed, with the normal operating mode selected. The pull-down hardware can be a jumper between two pins, and/or one or more pins driven to a given state during power-up. Alternatively, an existing signal could be used to achieve the pull-up/down function. The system reset signal is a global hardware signal derived from any of a multiplicity of signals, such as a power stable signal, clocks stable signal, or delay elapsed signal.

The ASIC will power-up with a root key read path directed away from the root key itself and into a writeable register for testing and debug. In the debug mode, the root key is not presented to the security electronics, rather an alternate register, having an alternate key, is presented to the security electronics. Since the root key is the root of all of the operating secrets, this allows debug to occur without revealing any of the secrets.

If on the rising edge of the system reset signal the electronics determine that the debug mode is not set, then the read path will be directed to the actual root key. Otherwise, if the debug mode is set, the read path will remain directed away from the root key. This will allow for hardware debug even with differing key values, without revealing the user's data or the root key for this drive. Also in the test/debug mode, the serial port function will change as described below.

To implement this feature, the ASIC hardware can detect the rising edge of the system reset signal and latch the state of the test/debug jumper setting(s). Then the hardware will redirect the read path for the root key, protecting the root key from use.

The drive serial port can be secured with drive firmware. The drive firmware in previously existing drives is capable of disabling the serial port via known hardware mechanisms. The definition below is intended to minimize the amount of ROM required, in addition to that used for a pure serial port authentication scheme.

In the normal operating mode, the serial port will initialize to the disabled state. The ROM code will check for valid drive firmware residing on the drive. If valid drive firmware is detected, control of the serial port will be passed to the drive firmware. If valid drive firmware is not detected, the ROM code will enable the serial port for a drive firmware download operation only (all other functions will be disabled).

On power-up in the debug mode, the ROM code will enable the serial port, but will only allow a drive firmware download operation through the serial port. For initial download of drive firmware to virgin drives (those that do not yet have any drive firmware), the drive firmware will be downloaded through the serial port, and simply be stored to the appropriate storage medium (flash or disc). On the subsequent boot-up, the downloaded drive firmware will be checked for authenticity and integrity. If it is good, it will be used, if not, the drive will halt operation and refuse to execute the unverifiable drive firmware. Verification can be performed using a multiplicity of techniques that are not a part of this invention.

The drive will always accept code download through the serial port when the drive is in the debug mode, regardless of the current state of the drive firmware on the drive.

The normal mode covers several possible scenarios. In a first scenario, the drive has valid drive firmware and this drive firmware has enabled the serial port. In that case, drive firmware may be downloaded via the serial port, host interface, or authenticated JTAG access.

In a second scenario, the drive has valid drive firmware and this drive firmware has disabled the serial port. In this case, drive firmware may not be loaded via the serial port, but may still be loaded via the host interface or authenticated JTAG access.

In a third scenario, the drive has no valid drive firmware. Here, the ROM code will enable the serial port for downloading drive firmware only. All other functions of the serial port are disabled.

Although this description specifies the download of drive firmware through the serial port, those skilled in the art will recognize that an actual application may enable the serial port for loading of an authenticated drive firmware bootstrap routine into RAM through the serial port. Then, after loading the authenticated bootstrap routine, that routine takes over control of the serial port.

The JTAG port can have four operating modes, labeled as modes 0 through 4. These modes are requested through the JTAG port and the drive responds by challenging the requestor to provide the appropriate credentials to access the requested mode.

Mode 0 is the normal drive operating mode with the debug mode disabled. In this mode the JTAG port only has authentication functionality, meaning that the JTAG access is limited to authentication routines required to authenticate requests to enter modes 1, 2 or 3. The drive responds with a normal trustworthy state for all responses. No authentication level is required.

Mode 1 is a test/boundary scan mode. Mode 1 can be used by an ASIC supplier to perform ASIC tests in its factory. In mode 1, the debug mode is enabled, and authentication is required. JTAG communication and ASIC test functions are enabled. The root key and all memory locations are disabled.

For this mode, and modes 2 and 3, all responses from the security hardware, the drive firmware, and the drive to the host system must indicate that the drive is operating in a non-trustworthy state. It doesn't mean that operations are not allowed, but only that the drive will provide an indication that it is not in a state that is considered trustworthy. This prevents an attack wherein an attacker puts the user's drive in this mode, and the user uses it indefinitely, thinking they are secure.

Mode 2 is an emulation mode. Mode 2 would be used by development personnel for emulation and debug of drives during development. In mode 2, the debug mode is enabled, and authentication is required with limited access via a token. Memory locations are enabled to initialize the embedded trace module (ETM). The test and boundary scan functions from mode 1 are disabled. In this mode only the registers required to configure the embedded trace module are enabled. This lets the authorized personnel configure the emulation capabilities without giving them access to all of the memory space. The test/boundary scan, and all memory locations are disabled.

Mode 3 is a full integration mode. Mode 3 would be used by a limited set of people. In mode 3, the debug mode is enabled, and authentication is required with exclusive access via a token and a personal identification number (PIN). All memory locations are accessible. The drive looks like a typical drive with everything accessible. This mode would include all of the features of mode 2, but also allows authorized access to all memory locations in the ASIC. In this mode, the drive would look just like it did prior to any port hardening.

For the modes requiring authentication, there will be a full authentication between the external JTAG and the drive itself. Again, this assumes/requires secure ROM code and/or drive firmware residing on the drive.

The JTAG is a widely used and widely supported interface with many off-the-shelf tools. To facilitate ease of use of these standard tools and a migration to new tools, a hardware facility can be added external to the drive.

This hardware will interrupt the JTAG path. This new hardware will perform the authentication of the drive, and then after valid credentials are presented, will allow the normal JTAG tools access to the drive. This will allow the development of the proprietary hardware internally, in low volume for test and debug situations. This will also allow for controlled distribution of the access hardware, and won't require revelation to outside vendors. Additionally, this hardware will have the facilities for attachment of a hardware token. The token can be, for example, a secret key or a biometric device. This token will allow controlled accessibility on an individual basis and will provide for revocation of access upon individuals leaving the project or company. It is also recommended that the accessing person be required to enter a PIN value on a keypad on the hardware. This will require the user to have "something they know" and "something they have" to gain access.

The JTAG port will be electrically disabled during power-up and when the normal operating mode is detected. The hardware can be electrically multiplexed into the four operating modes defined above.

Firmware/ROMWare will return a non-trustworthy status for all operations when the test/debug mode jumper is installed. Firmware/ROMWare will facilitate the JTAG authentication process and activate the correct functionality multiplexing setting after authentication.

The ETM port is an output only port. The ASIC will power-up with the ETM outputs disabled. The ETM port will only be enabled after authenticated access and configuration through the secured JTAG port.

When applied to a boundary scan test, the invention detects that a reset is externally applied to the secure subsystem under test prior to the transition into scan test mode to clear the contents of storage elements, thus preventing observability of secure information. The invention also detects that a reset is externally applied to the secure subsystem under test prior to the transition out of scan test mode to clear the contents of storage elements, thus preventing controllability of secure information or system state information. In both cases, the transition into, or out of, the scan test mode is prevented unless a reset has been applied.

Figure 4:
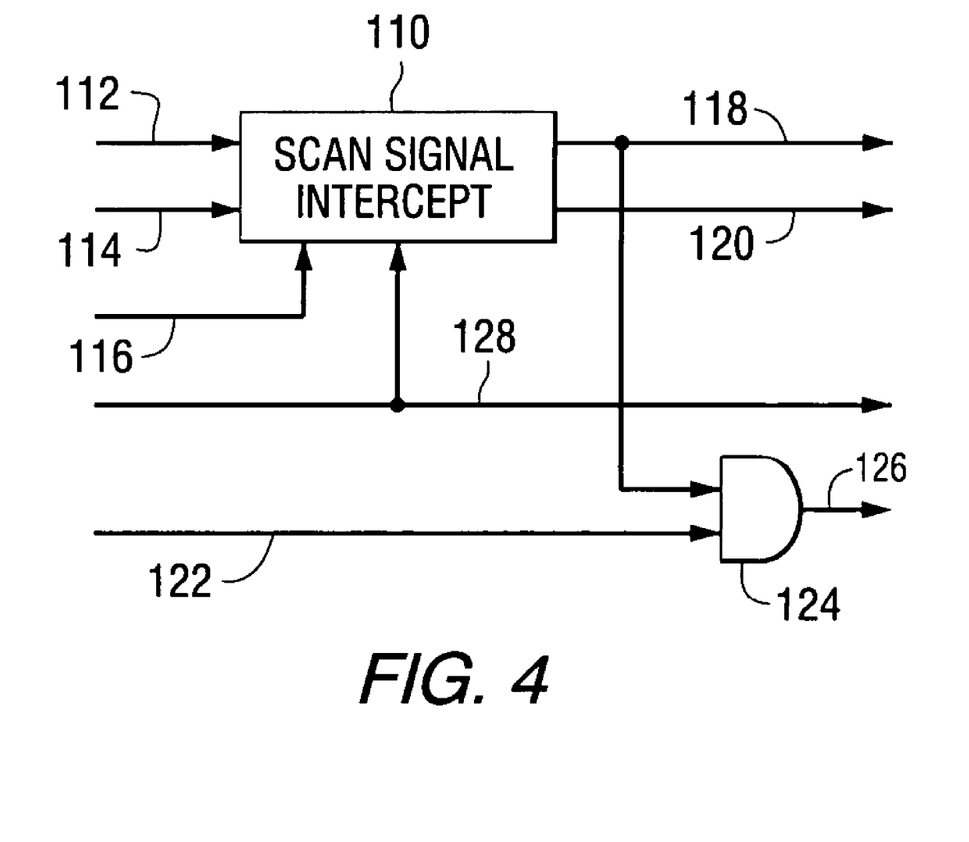
FIG. 4 is a schematic diagram of a boundary scan access control circuit.

FIG. 4 is a schematic diagram of a circuit that can intercept scan test signals in accordance with the invention. The circuit includes a scan signal intercept module 110 having inputs 112, 114 and 116 for receiving a system scan mode enable signal, a test reset signal (TRST), and a system reset signal, respectively. The scan signal intercept module 110 outputs a subsystem scan mode enable signal on line 118 and a subsystem reset signal on line 120. The subsystem scan mode enable signal is combined with a system scan enable signal on line 122, in an AND gate 124, to produce a subsystem scan enable signal on line 126. A clock signal is provided to the scan signal intercept module and the subsystem, on line 128.

A behavioral description of the scan signal intercept state machine is:

```
IF (TRST) THEN
    NEXTSTATE = SUBSYSTEM_SCAN_MODE_DISABLED
    Subsysten_Scan_Mode_Enable = 0
    Subsystem_Reset = 1
ELSE
    Subsystem_Reset = System_Reset
    CASE (State)
    SUBSYSTEM_SCAN_MODE_DISABLED:
        Subsystem_Scan_Mode_Enable = 0
        IF (System_Reset AND System_Scan_Mode_Enable)
        THEN
            NextState = SUBSYSTEM_SCAN_MODE_ENABLED
        ELSE
            NextState = SUBSYSTEM_SCAN_MODE_DISABLED
```

-continued

```
    SUBSYSTEM_SCAN_MODE_ENABLED:
        Subsystem_Scan_Mode_Enable = 1
        IF (System_Reset AND (NOT System_Scan_Mode_Enabled)
        THEN
            NextState = SUBSYSTEM_SCAN_MODE_DISABLED
        ELSE
            NextState = SUBSYSTEM_SCAN_MODE_ENABLED
```

The TRST signal is representative of a test logic signal, for example, being in the TEST-LOGIC-RESET state on the Test Access Port controller. The only requirement is that the scan intercept state machine be reset independently of the reset that is generated to the subsystem during the scan mode.

Forcing a subsystem reset with the application of a test reset signal (TRST) is only a requirement if TRST can be pulled low when the scan signal intercept state machine is in the SUBSYSTEM_SCAN_MODE_ENABLED state, and this requirement may be better handled through the test controller circuitry.

FIG. 4 is intended to be representative of a design that incorporates a scan test controller. Those skilled in the art will be able to realize alternative implementations that prevent scan functionality within a subsystem depending on the presence of an external reset.

The port hardening scheme assumes a secure download firmware process for all drive firmware downloads, including controller, servo, factory, and other firmware. The drive hardware will inherently trust the drive firmware that resides on the drive. For the purposes of the ports, the drive will not trust connections from the outside world without proper authentication.

While the invention has been described in terms of several examples, it will be apparent to those skilled in the art that various changes can be made to the described examples without departing from the scope of the invention as set forth in the following claims.

What is claimed is:

1. An apparatus comprising:
at least one port for coupling signals to the apparatus;
a pull-up/down mode selector for setting the apparatus to a normal mode or a debug mode; and
a port control for controlling access to secure information in the apparatus through the port in accordance with the selected mode, wherein when the apparatus is in the debug mode, access to a root key is prevented and an alternate key is accessible.

2. The apparatus of claim 1, further comprising:
a circuit for latching a state of the pull-up/down mode selector in response to a reset signal.

3. The apparatus of claim 1, wherein different levels of accessibility are provided depending upon one or both of: the nature of the port, and a level of security risk posed by unauthorized access to that port.

4. The apparatus of claim 1, wherein the apparatus comprises a disc drive.

5. An apparatus comprising:
at least one port for coupling signals to the apparatus;
a mode selector for setting the apparatus to a normal mode or a debug mode; and
a port control for controlling access to secure information in the apparatus through the port in accordance with the selected mode, wherein the port control only permits a drive firmware download if the device does not initially include drive firmware.

6. The apparatus of claim 5, wherein the apparatus provides an indication of a reduced state of trust when in the debug mode.

7. A method of controlling access to at least one port of an apparatus, the method comprising:
setting the apparatus to a normal mode or a debug mode using a pull-up/down mode selector; and
controlling access to secure information in the apparatus through the port in accordance with the selected mode, wherein when the apparatus is in the debug mode, the step of controlling access to secure information comprises preventing access to a root key and providing access to an alternate key.

8. The method of claim 7, further comprising:
latching a state of the pull-up/down mode selector in response to a reset signal.

9. The method of claim 7, wherein the steps preventing access to a root key, and providing access to an alternate key comprise:
switching a root key path to an alternate key path.

10. The method of claim 7, wherein different levels of accessibility are provided depending upon the nature of the port and/or upon a level of security risk posed by unauthorized access to that port.

11. A method of controlling access to at least one port of an apparatus, the method comprising:
setting the apparatus to a normal mode or a debug mode using a mode selector; and
controlling access to secure information in the apparatus through the port in accordance with the selected mode, wherein the port control only permits a drive firmware download if the device does not initially include drive firmware.

12. The method of claim 11, wherein the apparatus provides an indication of a reduced state of trust when in the debug mode.

13. A method of controlling access to at least one port of an apparatus, the method comprising:
setting the apparatus to a normal mode or a debug mode using a mode selector; and
controlling access to secure information in the apparatus through the port in accordance with the selected mode, wherein:
when the apparatus is in the normal mode, initialize a serial port to a disabled state, and check for valid drive firmware in the apparatus, then if valid drive firmware is in the apparatus, control the serial port using the drive firmware; and
when the apparatus is in the debug mode, enable the serial port only for download of drive firmware.

14. The method of claim 13, further comprising:
providing an indication of a reduced state of trust when the apparatus is in the debug mode.

15. A method of controlling access to at least one port of an apparatus, the method comprising:
setting the apparatus to a normal mode or a debug mode using a mode selector; and
controlling access to secure information in the apparatus through the port in accordance with the selected mode, wherein when the apparatus is in the normal mode, valid drive firmware is in the apparatus, and the serial port is enabled, then allow drive firmware download through the serial port, a host interface, or an authenticated JTAG access.

16. The method of claim 15, further comprising:
providing an indication of a reduced state of trust when the apparatus is in the debug mode.

17. A method of controlling access to at least one port of an apparatus, the method comprising:
setting the apparatus to a normal mode or a debug mode using a mode selector; and
controlling access to secure information in the apparatus through the port in accordance with the selected mode, wherein when the apparatus is in the normal mode, valid drive firmware is in the apparatus, and the serial port is disabled, then allow drive firmware download through a host interface, or an authenticated JTAG access.

18. The method of claim 17, further comprising:
providing an indication of a reduced state of trust when the apparatus is in the debug mode.

19. A method of controlling access to at least one port of an apparatus, the method comprising:
setting the apparatus to a normal mode or a debug mode using a mode selector; and
controlling access to secure information in the apparatus through the port in accordance with the selected mode, wherein when the apparatus is in the normal mode and valid drive firmware is not in the apparatus, enable the serial port only for download of drive firmware.

20. The method of claim 19, further comprising:
disabling a JTAG port during power-up and when the apparatus is in the normal mode.

21. The method of claim 19, further comprising:
enabling a JTAG port in one of a plurality of operating modes.

* * * * *